J. SLOTNAES.

LATHE.

APPLICATION FILED JULY 19, 1918.

Reissued Aug. 20, 1918. 14,509.

Inventor:
J. Slotnaes.
by
Attorney

THE NORRIS PETERS CO., PHOTO-LITHO., WASHINGTON, D. C.

UNITED STATES PATENT OFFICE.

JENS SLOTNAES, OF GREFSEN, CHRISTIANIA, NORWAY.

LATHE.

14,509. Specification of Reissued Letters Patent. Reissued Aug. 20, 1918.

Original No. 1,261,963, dated April 9, 1918, Serial No. 142,539, filed January 15, 1917. Application for reissue filed July 19, 1918. Serial No. 245,677.

*To all whom it may concern:*

Be it known that I, JENS SLOTNAES, citizen of Norway, resident of Grefsen, city of Christiania, and State of Norway, have invented certain new and useful Improvements in Lathes, of which the following is a specification.

The present invention relates to turning lathes and more especially to those having a threaded lead screw and a special feed-shaft.

It has already been proposed to provide turning lathes with two leading screws having different pitch in order to reduce the number of gear wheels in the ordinary change gear box. However, in those cases, the lead screws were constructed according to one and the same screw system *i. e.* the pitch was measured in one and the same unit, ordinarily in English inches or fractions thereof.

At present many screws are made with a pitch measured in millimeters, and on that account it has been desirable to so arrange screw cutting lathes that screws with millimeter-pitch and inch pitch can be easily cut in one and the same machine. This problem has been solved by the gear box being provided with a change wheel with 127 teeth, because one half inch equals 12.699889 or nearly 12.7 mm., the error being only about 0.001%.

According to my invention the same problem is solved in another still simpler manner. I provide not only the lead screw but also the feed shaft with screw threads of different pitch, and the novelty of my invention resides in this, that if the threads of the lead-screw are made with a pitch measured in inches, I make the threads of the feed shaft with a pitch measured in millimeters, or vice-versa.

The apron consequently must have two screw-locks, one made for inch-pitch and another made for millimeter-pitch. By means of a special change-mechanism between the locks, only one of the locks can be put into operation at a time.

Figure 2:
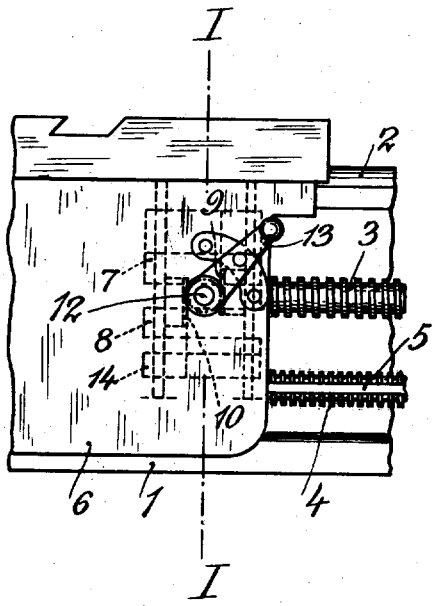
Figure 1:
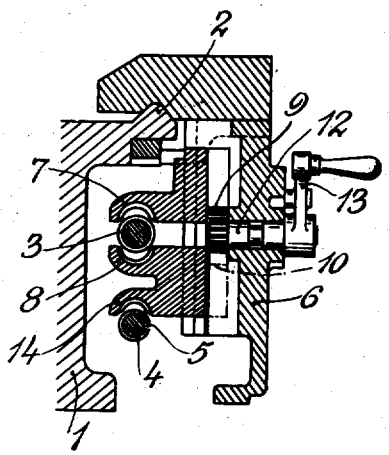

My invention is illustrated by way of example in the accompanying drawing, in which:

Figure 1 is a cross section along the line I—I in Fig. 2, showing the lead screw and feed screw of a lathe, while Fig. 2 shows a part of the lathe as seen from the right in Fig. 1.

The frame 1 is provided with the usual upper guiding rail 2, 3 is the lead-screw, 4 the feed-shaft, provided with the longitudinal key groove 5, 6 the apron, 7, 8 the ordinary half-nuts for the lead-screw, 9, 10 the racks upon the nuts 7, 8 respectively, 11 the pinions engaging the racks for moving the nuts 7, 8 in opposite directions and 12 the pinion operating shaft provided with the outer handle 13. The half nut 14 for the feed-shaft 4 forms one integral part with the half-nut 8 for the screw 3. Besides, the arrangement is so devised that both the half-nuts 7, 8 and the half-nut 14 are out of engagement with their respective screws as shown in Fig. 1, when the handle 13 is in its middle or neutral position.

When the handle 13 is turned down, the half-nuts 7, 8 engage their screw 3, whereas the half-nut 14 remains disengaged. When the handle 13 is turned up, the half-nut 14 engages its screw 4, while the half-nuts 7, 8 become disengaged. Thus, it will be seen that both screws cannot be engaged by their coöperating half-nuts at the same time.

By the arrangement described above the advantage is obtained that if millimeter-threads have to be cut in an ordinary lathe having a lead-screw with an inch-pitch, the use of the ordinary change-wheel with 127 teeth can be avoided. Further the screws may be engaged in any adjusted position without any fault arising. This latter is not possible in the ordinary lathe having a lead-screw with an inch-pitch and a change-wheel with 127 teeth.

According to my invention the lead-screw and feed-shaft should have the same number of revolutions. In such case the pitches most frequently in use may be obtained by means of the change-wheels ordinarily used in a lathe. If the lathe is provided with a gear-box, the same advantages are obtained.

Lately one has frequently arranged a special feed-shaft in the lathe in order to avoid a key-groove throughout the length of the lead-screw. In such lathes the present arrangement may be utilized easily by simply cutting threads in the existing feed-shaft. At the same time, the lathe originally designed for cutting screws with an inch-pitch may always be ready for use for cutting screws with a millimeter-pitch.

Having now described my invention, what I claim as new and desire to secure by Letters Patent is:

In a turning lathe, the combination of a lead screw and a threaded feed-shaft having threads of a different pitch, one being provided with the inch pitch and the other with the pitch in millimeters.

Signed at Christiania, State of Norway, this eighth day of December, A. D. 1916.

JENS SLOTNAES.

Witnesses:
AXEL LAHN,
MOGENS BUGGE.

Copies of this patent may be obtained for five cents each, by addressing the "Commissioner of Patents, Washington, D. C."